INVENTOR.
JIMMY C. C. WU
BY Ej Holland
W A Schaich
ATTORNEYS

United States Patent Office 3,436,203
Patented Apr. 1, 1969

3,436,203
COATED REFRACTORY FOR CONTACTING MOLTEN GLASS AND METHOD OF MAKING
Jimmy C. C. Wu, Kowloon, Hong Kong, assignor to Owens-Illinois, Inc., a corporation of Ohio
Filed May 29, 1964, Ser. No. 371,230
Int. Cl. C03b 39/00
U.S. Cl. 65—374                 10 Claims

ABSTRACT OF THE DISCLOSURE

A metal-lined, refractory material resistant to high-temperature, molten glass and which is protected from electrolytic deterioration by a protective metal-oxide interliner disposed or bonded interfacially between the refractory material and a noble metal or noble metal alloy liner. The metal-oxide interliner is characterized by having an electrical resistivity selectively matched with that of the metal liner to provide an interfacial electrical contact potential therebetween which, when contacted by molten glass seeping or leaking through the metal liner, will be less than about 0.06 D.C. volt. The metal-lined refractory material is produced by coating a high-temperature refractory material with at least one of several disclosed adherent metal-oxides possessing an electrical resistivity of less than $1 \times 10^3$ ohms per cubic centimeter at 1,000° C. and less than $1 \times 10^2$ ohms per cubic centimeter at 1,300° C., and by applying an adherent noble metal or noble metal alloy coating over the metal-oxide coating to thereby form a refractory material having a protective metal-oxide interliner sandwiched between the high-temperature, refractory material and the noble metal or noble metal alloy which exhibits an interfacial electrical contact potential between the metal-oxide interliner and the noble metal or noble metal alloy which when contacted by molten glass is less than 0.06 D.C. volt.

---

The present invention relates to improved refractory materials and particularly to coated refractory materials suitable for contacting molten glass during its retention in tanks, forehearths, feeders and the like.

The corrosive action which occurs from molten glass contacting refractory surfaces of glass melting and handling equipment and the introduction of minor amounts of contaminants into the molten glass from such surfaces are common problems in the glass industry. The combined physical attack evidenced by washing away of the refractory material in glass melting and handling apparatus and the corrosive chemical attack evidenced by the wearing away of the furnace sidewalls due to the reaction between molten glass and the refractory at the glass surface adversely affect the quality of the glass.

In the normal operation of a glass melting furnace, the glass level will frequently vary within limits causing the refractory wall to wear away, particularly at the glass line, some of the refractory going into solution in the molten glass forming cords, seeds, blisters and the like in the glass. Also, minute fragments of the refractory may enter the molten glass in the form of small stones or specks. These various cords, seeds, blisters, etc. in molten glass are particularly harmful when the glass is to be formed into a high-quality product such as television picture tube face plates, tumblers, glass blocks and the like, which non-uniformity and contamination in the molten glass results in visible defects in the final product. Additionally, the passage of molten glass through a conveying forehearth and feeder may cause the dimensions thereof to increase due to wear, particularly in the case of the feeder orifice.

Refractory members have previously been clad with noble metals such as platinum and platinum alloys to provide corrosion and contaminant-resistance, particularly at points of most severe attack of surfaces of glass melting and handling apparatus. This procedure has met with limited application due to physical properties of platinum and its alloys requiring such installation to possess relatively heavy and expensive wall sections. Further, despite the cross-sectional thickness of such wall sections being relatively heavy, depending upon its manner of application, such noble metal cladding has been found to develop pin-holes or minute openings through which molten glass can contact essentially crystalline metallic oxide refractory material backing the platinum to form an electrolytic cell. It has been observed that between the platinum or platinum alloy coating and various forms of conventional crystalline refractory materials that a relatively high contact potential is established which results in the introduction of seeds or blisters into the molten glass. This invention is directed to obviating this problem.

Accordingly, it is an object of this invention to provide improved apparatus for retaining molten glass during melting and subsequent handling to prevent contamination thereof due to electrolytic effects by stones, seeds, blisters, cords or refractory particles being introduced into the glass.

Another object of this invention is to provide coated refractory for producing and handling molten glass of highest quality, the refractory material contacting molten glass being given prolonged life.

Another object of this invention is to provide a novel method of applying a protective coating to refractory blocks and other glass handling apparatus, the coating being multilayered and capable of developing only low contact potential at elevated temperatures of molten glass.

Other objects and advantages will be apparent from the following description.

Figure 1:
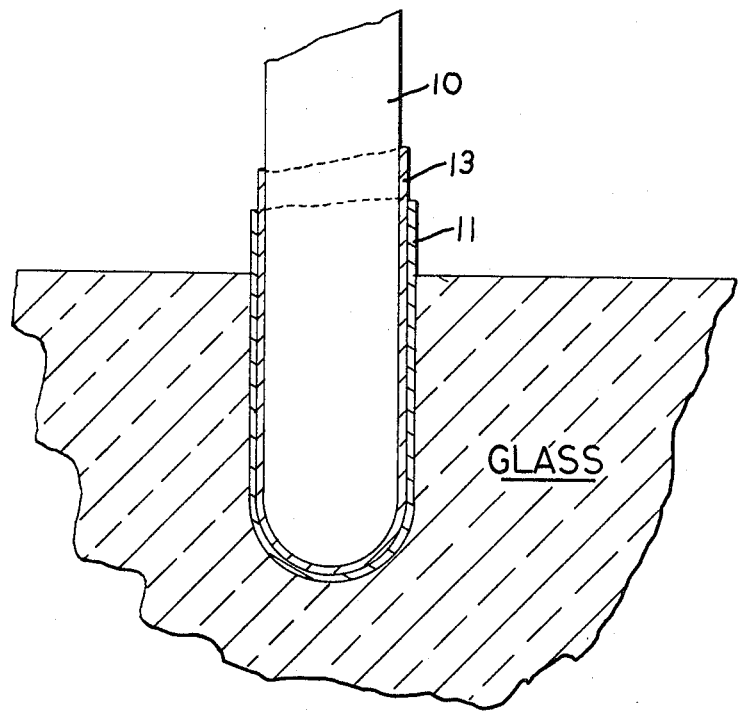
FIG. 1 is a side elevational view partly in section of a refractory plunger in molten glass.

The objects of the present invention are attained by applying a continuous layer of metallic oxide having relatively-low electroconductivity to the refractory surface or substrate and overcoating the same with a second continuous layer of relatively-high electroconductivity noble metal such as those metals and alloys of metals which are especially suitable for contacting molten glass including platinum and its alloys.

The intermediate first-applied layer preferably consists of a transparent electroconductive tin oxide film. Over this a thin coating or foil of a metal such as platinum or platinum-rhodium alloy is deposited such as by flame spraying. The multicoated refractory material is then capable of use in constructing glass handling apparatus such as glass melting tanks, stirring apparatus, forehearths, feeders and the like, all surfaces thereof which contact the molten glass being so coated. The intermediate film or layer has the unusual characteristic of being at least partially electroconductive, the particular degree of electroconductivity being dependent to a considerable degree upon the precise composition of the film and process of deposition.

The intermediate electroconductive film may be deposited on the refractory surface or substrate by applying stannic fluoride to the surface of the refractory heated above 500° F., preferably 850° F. to 1,350° F. Films of desired conductivity may be produced by spraying the refractory surface while it is heated to a temperature of about 550° F., but below the temperature at which its surfaces may be deleteriously affected, with tin tetrachloride or other tin salts in aqueous solution, or in vapor state in the presence of reducing agents such as methanol, phenyl hydrazine hydrochloride or other reagents. Films thus produced contain a major amount of tin oxide of the amount of about 97 to 99% $SnO_2$ and certain impurities which may include metallic tin, carbon, silica, sodium, chlorine and other impurities depending upon the composition of the tin-containing solution.

The first-applied electroconductive metal oxide film may be composed of other metal oxides in combination with tin oxide or of other metal oxides alone, such as cadmium oxide, barium oxide, cerium oxide, chromic oxide, ferric oxide, zinc oxide, indium oxide, cobalt oxide, nickel oxide, manganese oxide, or combinations thereof.

The following table indicates in values of electrical resistivity at various prescribed temperatures some of the oxides which possess electrical resistivities of less than $1 \times 10^3$ ohms per cubic centimeter at 1,000° C. and of less than $1 \times 10^2$ ohms per cubic centimeter at 1,300° C. and which consequently are sufficiently electroconductive to provide a low contact potential of less than 0.06 D.C. volt when contacted by molten glass in combination with the noble metal or noble metal alloy overlayer. Even more preferably, the metallic oxide, or oxides, should, like those appearing in Table I, possess an electrical resistivity of not greater than $1 \times 10^2$ ohms per cubic centimeter at temperatures of about 1,300° C. The values in Table I are taken from the book entitled, "Refractories," by F. H. Norton (1949), on pp. 320 and 321.

TABLE I

| | Resistivity (ohms per cc.) |
|---|---|
| Barium oxide | $1 \times 10^6$ (300° C.) |
| (baria) | $2.2 \times 10^1$ (500° C.) |
| Cerium oxide | $2.2 \times 10^3$ (800° C.) |
| (ceria) | $1.9 \times 10^1$ (1,200° C.) |
| Chromic oxide | $12.7 \times 10^2$ (350° C.) |
| | $7.5 \times 10^1$ (750° C.) |
| Ferric oxide | $3.6 \times 10^{-2}$ (200° C.) |
| (hermatite) | $2.8 \times 10^{-2}$ (200° C.) |
| Nickel oxide | $6.7 \times 10^3$ (600° C.) |
| (bunsenite) | $1.4 \times 10^2$ (1,000° C.) |
| | $2.4 \times 10^1$ (1,250° C.) |
| Tin oxide | $6.6 \times 10^3$ (800° C.) |
| (cassiterite) | $2.6 \times 10^2$ (1,000° C.) |
| | $1.0 \times 10^1$ (1,300° C.) |
| Zinc oxide | $6.7 \times 10^3$ (800° C.) |
| (zincite) | $7.1 \times 10^2$ (1,000° C.) |
| | $5 \times 10^0$ (1,350° C.) |

Following the application of the first coating, a second coating, preferably of noble metal is deposited thereover, said second coating consisting of preferably platinum and platinum alloys, or indium and indium alloys. An especially convenient means of applying the uniform continuous noble metal coating is by flame spraying. When the refractory part being sprayed has been fully coated with the electroconductive metallic oxide film, the second metallic coating bonds tenaciously therewith upon a flame spraying application. This process utilizes a gun equipped with a hot blast flame through which the powdered metal is blown, thus converting the solid metal powder into fused flaming molten particles which deposit on the part and solidify as a firmly-adhering coating. The metal coating thus applied provides a continuous impervious film over the entire surface and extends coextensively with the intermediate electroconductive film or coating.

In a modified form of my invention, the noble metal may be applied by other well-known processes such as plating or cladding, the second film being applied over and extending coextensively with the first-applied coating. Subsequent firing of the body may be desirable in the case of certain ceramics to effect bonding of the several coatings to the ceramic body. The firing temperatures and time may be selected depending upon the requirement of the particular ceramic involved. The invention is of special utility in coating many refractory materials used in the glass melting industry. Some of these include alumina, barium oxide, beryllia, cassiterite, chromite, chromic oxide, fire clay, forsterite, kyanite, magnesia, magnesia spinel, mullite, silica, thoria, titania, zircon and zirconia.

It has been found that it is particularly desirable that the several layers overlying the refractory body exhibit a low contact potential in contact with each other when disposed intermediate the refractory and molten glass at elevated temperatures. Low contact potential means that the electrical resistivity of each of the two substances in direct contact be matched sufficiently close that the resultant electrical potential will be inherently maintained below the level of about 0.1 D.C. volt and more preferably below about 0.06 D.C. volt when containing molten glass. As is known, all metals, electrolytic solutions and other substances containing "free" ions or electrons exhibit a difference of potential on direct contact which potential is markedly increased at the elevated temperatures of molten glass.

Figure 2:
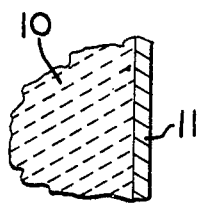
FIGS. 2, 3 and 4 are enlarged fragmentary sectional views of noble metal coatings on refractory surfaces made in accordance with the prior art.
Figure 3:
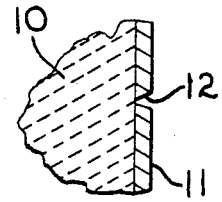
Figure 4:
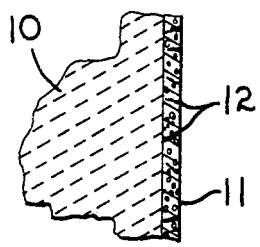
Figure 7:
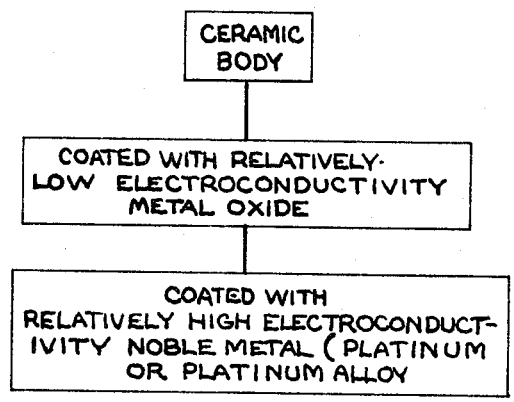
FIG. 7 is a type of schematic block diagram illustrating various preferred method steps of the present invention.

It has been found that where platinum and platinum alloys containing at least 80 percent platinum have been deposited on a ceramic body 10 such as shown in FIG. 2, the platinum coating 11 may develop slight fissures or cracks 12, as shown in FIGS. 3 and 4, which serve to create an electrolytic action. The cell effect created between the platinum and refractory contacting molten glass has been found to measure from about 0.2 to 0.3 D.C. volt in the range of 1,800° to 2,400° F. Such condition is particularly conducive to the formation of seeds and blisters in the molten glass where the oxygen overvoltage of platinum is exceeded, thus creating a breakdown of the oxides and forming free oxygen in the molten glass adjacent the noble metal coating. This may result in serious blister formation in the glass, primarily due to the electrochemical action of the cell of low circuit resistance which is formed between the platinum metal layer, refractory substrate and the glass when some molten glass infiltrates through the porous platinum coating and comes in contact with the refractory. As indicated above, the potential of this cell has been measured to be high, and at times, much higher than the oxygen overvoltage of platinum in molten glass.

It has been observed that platinum on contact with fused case alumina-zirconia-silica refractory in molten glass creates a potential ranging from 0.3 to 0.4 D.C. volt at about 2,030±30° F. Also platinum is contact with fused case alumina refractory has shown a potential ranging from 0.11 to 0.20 D.C. volt in the temperature range of 1,915° to 2,030±30° F. Further, platinum in contact with alumina-silicate (mullite) refractory has shown a potential ranging from 0.34 to 0.35 D.C. volt in the same temperature range as above.

In a preferred embodiment of my invention, the refractory surface is flame sprayed with an electroconductive tin oxide base layer of substantially uniform thickness of the order of about 1/32 to 1/16-inch before platinum coating. The platinum or platinum alloy containing at least 80 percent platinum is then deposited over the tin oxide layer as above-described. The tin oxide film has been found to have an electrical resistivity, as shown in Table I, of $2.6 \times 10^2$ ohms per cubic centimeter at 1,000° C. and thus to provide an unusually low contact potential of from about +0.04 to −0.04 D.C. volt with platinum in molten glass at elevated temperatures ranging from about 1,800° to 2,400° F. Thus, the tendency of oxygen blister formation between tin oxide and platinum metal is much lower than between the refractory in direct contact with the platinum metal in molten glass.

Figure 5:
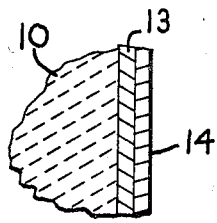
FIGS. 5 and 6 are enlarged fragmentary sectional views of refractory surfaces coated in accordance with the present invention.
Figure 6:
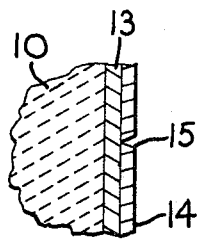

FIGS. 5 and 6 illustrate the refractory substrate 10 being first coated with an intermediate layer 14 of metallic oxide of relatively low electroconductivity with an outer layer 14 of noble metal or noble metal alloy of relatively-high electroconductivity. FIG. 6 illustrates that should outer layer 14 become deteriorated in use to form minute pinholes or fissures 5, only a low voltage cell is created which is not conducive to forming seeds or blisters.

The present invention overcomes the difficulties of applying thin flame-sprayed platinum coatings on rough refractory surfaces wherein the inherent porosity of the platinum coating is difficult to avoid completely. The tin oxide precoating of the refractory is advantageous in preventing blister formation due to infiltration of molten glass through the pores or grain boundaries of the platinum coating. Concurrently, the refractory is protected from molten glass corrosion and electrolytic effects are maintained at a minimum.

Various modifications may be resorted to within the spirit and scope of the present invention.

I claim:

1. In the method of producing a metal-lined, refractory substrate susceptible to use with molten glass and comprising the steps of:
    placing a substantially continuous first layer of metallic oxide material over said refractory substrate,
    and placing a substantially continuous second layer of metallic material over said first layer,
    said second layer being a metallic material selected from at least one of the group consisting of noble metals, noble metal alloys, and combinations thereof,
    the improvement comprising
    employing as said first layer a metallic oxide composition consisting essentially of at least one of the group of metallic oxides consisting of tin oxide, cadium oxide, barium oxide, cerium oxide, chromic oxide, ferric oxide, zinc oxide, indium oxide, cobalt oxide, nickel oxide and manganese oxide.

2. In the method, as defined in claim 1, including the improvement wherein:
    said second layer comprises a metallic material selected from the group consisting of platinum and platinum alloys containing at least 80 percent platinum.

3. In a coated refractory body resistant to molten glass at elevated temperatures for prolonged time periods comprising:
    a refractory substrate consisting essentially of crystalline metallic oxide composition,
    a plural-layered substantially continuous coating adhered directly to said refractory substrate,
    said coating being comprised of an outer layer of noble metal selected from the group consisting essentially of platinum and platinum alloys, and an intermediate metallic oxide layer,
    the improvement wherein
    said intermediate metallic oxide layer consists essentially of at least one metallic oxide selected from the group consisting of tin oxide, cadmium oxide, barium oxide, cerium oxide, chromic oxide, ferric oxide, zinc oxide, indium oxide, cobalt oxide, nickel oxide and manganese oxide.

4. In a coated refractory body, as defined in claim 3, including the improvement wherein
    said intermediate layer is essentially composed of stannic oxide having a substantially uniform thickness ranging from about $\frac{1}{32}$ to $\frac{1}{16}$-inch and said outer layer is essentially composed of noble metal,
    and the contact potential between said layers in contact with molten glass is within the range of from about +0.04 D.C. volt to −0.04 D.C. volt.

5. In a coated refractory body, as defined in claim 3, wherein:
    said refractory body is essentially composed of at least one of the materials selected from the group of materials consisting of alumina, barium oxide, beryllia, cassiterite, chromite, chromic oxide, fire clay, forsterite, kyanite, magnesia, magnesia spinel, mullite, silica, thoria, titania, zircon and zirconia.

6. In the method, as defined in claim 1, wherein said first layer of metallic oxide consists essentially of tin oxide.

7. In a coated refractory body, as defined in claim 3, including the improvement wherein said outer layer and said intermediate layer cooperate in contact with molten glass to produce therebetween an interfacial contact potential which in contact with molten glass will be less than above 0.06 D.C. volt.

8. In a coated refractory body, as defined in claim 3, including the improvement wherein said intermediate layer of metallic oxide possesses an electrical resistivity of not greater than about $1 \times 10^3$ ohms per cubic centimeter at a temperature of 1000° C.

9. In a coated refractory body, as defined in claim 3, including the improvement wherein said layer composed essentially of a noble metal consists essentially of a platinum-rhodium alloy.

10. In a coated refractory body, as defined in claim 3, wherein said intermediate metallic oxide layer consists essentially of tin oxide.

References Cited

UNITED STATES PATENTS

| 2,777,254 | 1/1957 | Siefert et al. | 65—374 X |
| 2,947,114 | 8/1960 | Hill | 65—374 X |
| 3,230,060 | 1/1966 | Lippmann | 65—374 X |

DONALL H. SYLVESTER, *Primary Examiner.*

A. D. KELLOGG, *Assistant Examiner.*

U.S. Cl. X.R.

65—362; 117—123, 125

U.S. DEPARTMENT OF COMMERCE

PATENT OFFICE

Washington, D.C. 20231

UNITED STATES PATENT OFFICE
CERTIFICATE OF CORRECTION

Patent No. 3,436,203            April 1, 1969

Jimmy C. C. Wu

It is certified that error appears in the above identified patent and that said Letters Patent are hereby corrected as shown below:

Column 4, line 23, "containing" should read -- contacting --; line 55, "is" should read -- in --. Column 5, line 10, "5" should read -- 15 --.

Signed and sealed this 17th day of March 1970.

(SEAL)
Attest:

Edward M. Fletcher, Jr.            WILLIAM E. SCHUYLER, JR

Attesting Officer            Commissioner of Patents